United States Patent Office 3,021,548
Patented Feb. 20, 1962

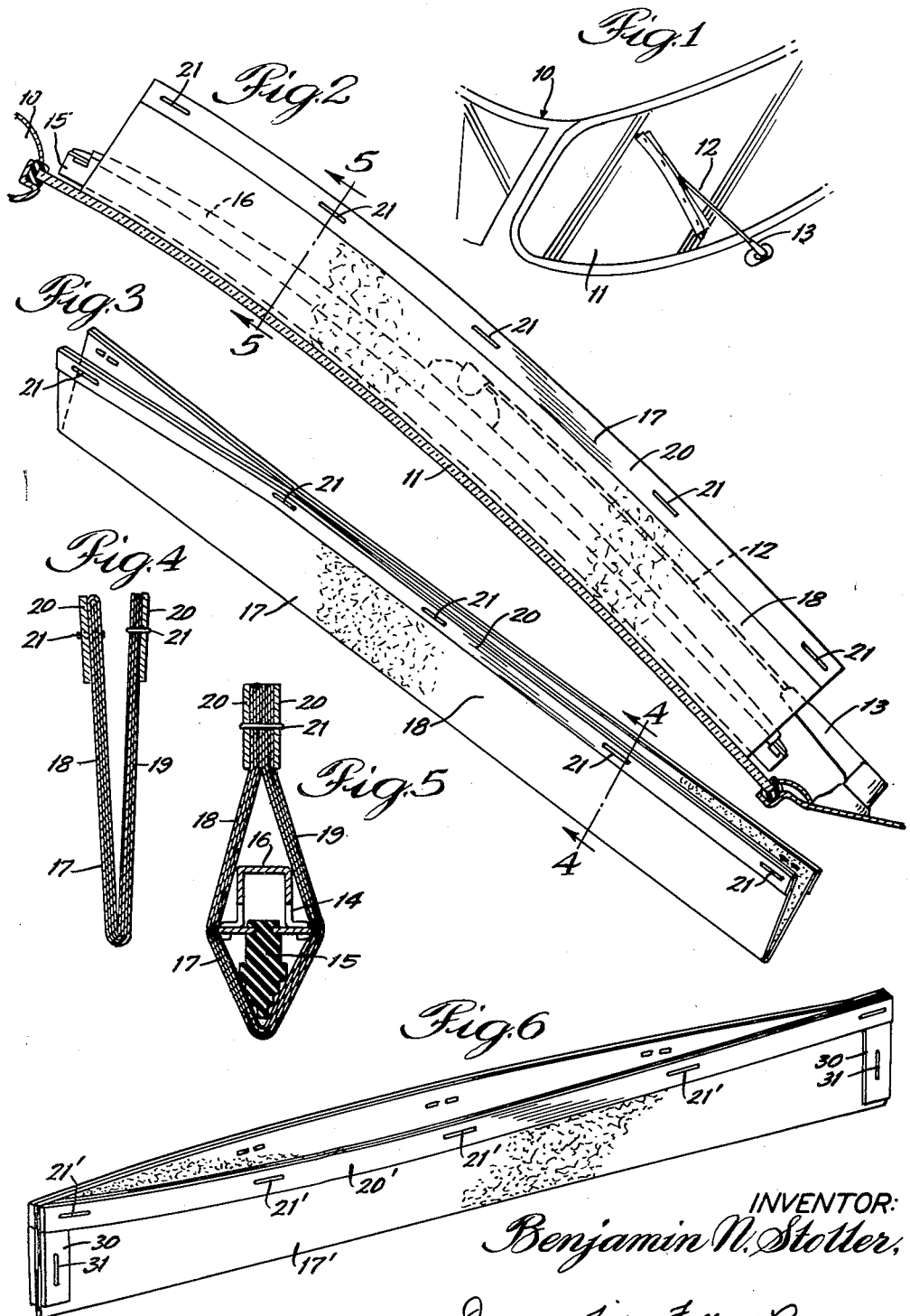

3,021,548
WINDSHIELD WIPER ATTACHMENT
Benjamin N. Stoller, 6703 S. Merrill Ave.,
Chicago 49, Ill.
Filed Apr. 20, 1959, Ser. No. 807,559
5 Claims. (Cl. 15—250.36)

This invention relates to a windshield wiper attachment, and more specifically, to an attachment for the cleaning of dry, or relatively dry, windshields.

As is well known, conventional windshield wipers for vehicles, boats and aircraft all require the presence of water or some other liquid upon the window for effective wiping and cleaning action. Unless a substantial quantity of water is present upon the windshield, attempts to clear the glass by operation of the wipers usually results in smearing of the dirt or grime and further impairment of visibility. While attachments are commercially available for distributing a cleansing liquid upon windshields to permit cleaning action by the wipers even in dry weather, such accessories are relatively expensive and appear only as optional equipment on most vehicles. Furthermore, such devices require servicing and are subject to mechanical breakdown or malfunctioning, especially during the cold winter months when, unfortunately, there is even a greater need for effective window cleaning attachments or devices because of slush and muddy water often kicked up by moving vehicles.

Accordingly, it is an object of the present invention to provide an inexpensive and highly effective windshield wiper attachment for removing dirt and grime from dry, or relatively dry, windshields. Another object is to provide an inexpensive dirt-absorbent device which may be readily connected to the wiper blade of a vehicle, boat, etc., and which will remain upon that blade during movement of the wiper arm by the normal tension of such arm. A further object is to provide an absorbent cover for windshield wiper blades which permits longitudinal flexure of such a blade and which therefore is adapted to conform to the curvatures of modern windshields. A still further object is to provide a temporary wiper cover formed from dirt-absorbent material which is self-discarding and will automatically disconnect itself from a wiper when it is worn out.

Other objects will appear from the specification and drawings, in which:

FIGURE 1 is a broken perspective view showing a vehicle equipped with the windshield wiper attachment of the present invention;

FIGURE 2 is a side elevation, taken partly in section, showing the attachment mounted upon the windshield wiper of a vehicle;

FIGURE 3 is a perspective view of the attachment illustrated in FIGURES 1 and 2;

FIGURE 4 is an enlarged cross-sectional view taken along line 4—4 of FIGURE 3;

FIGURE 5 is an enlarged cross-sectional view taken along line 5—5 of FIGURE 2; and FIGURE 6 is a perspective view of a windshield wiper attachment constituting a second embodiment of the present invention.

In the embodiment illustrated in FIGURES 1–5, the numeral 10 generally designates a vehicle having a windshield 11 and a windshield wiper 12. The wiper comprises an arm 13 which has its lower end pivotally mounted upon the vehicle beneath the windshield and which carries at its free upper end a wiper blade assembly 14. As indicated in FIGURES 2 and 5, the elongated wiper blade 15 is carried by an elongated connector 16 which in turn is joined intermediate its ends to the free end of the wiper arm 13. Thus, as the power-driven wiper oscillates from side to side, the wiper blade, in normal operation, sweeps over the surface of the windshield and wipes water, ice and snow therefrom. Since the above structure and its operation is entirely conventional, further description of such structure is believed unnecessary herein for the purpose of disclosing the present invention.

The wiper attachment illustrated in FIGURES 1–5 comprises an elongated cover or sleeve 17 having multiple layers formed from absorbent sheet material. While a strong, porous paper having considerable wet strength has been found particularly suitable, it will be understood that other materials having similar properties might be used.

Preferably, cover 17 is slightly shorter than the wiper blade upon which it is mounted, for reasons which will appear shortly. As shown most clearly in FIGURE 4, the cover is of generally V-shaped cross-section and is provided with side walls 18 and 19. Reinforcing means consisting of relatively stiff strips 20 of cardboard or other suitable material extend along the free longitudinal edges of the cover and are connected to the side walls by staples 21 or by any other suitable means. Strips 20 lend a degree of stiffness to the cover to facilitate handling and attachment of that cover. While the strips are illustrated as separate elements connected to the longitudinal edges of the cover, it is to be understood that such elements might be formed integrally with the side walls and, if desired, might be impregnated with a suitable material which, when hardened increases the stiffness of the reinforcing portions.

The reinforced longitudinal edges of the cover are joined at one point intermediate the ends of the cover by one of the staples 21. Therefore, in the zone of the edge-connecting staple, the cover completely encloses the wiper blade assembly 14 when the cover is mounted thereon (FIGURE 5). While the upper longitudinal edge portions of the cover 17 might be connected to each other at two or more points along their length, I prefer to connect such edges only at a single intermediate point or zone so that the side walls adjacent the ends of the cover may be easily spread apart to facilitate insertion (or removal) of the wiper blade assembly. Furthermore, while the reinforcing strips 20 are capable of a limited amount of longitudinal flexure along the planes of the side walls 18 and 19, the fact that they are free to bend outwardly or laterally in opposite directions along a substantial portion of their entire length, permits a greater degree of bending of the cover than would otherwise be possible as it is moved over the curved surface of a windshield.

To mount cover 17, the wiper assembly is simply lifted away from the windshield and the cover attachment is slipped from either end of the blade into the position shown in FIGURE 2. Then, when operation of the wiper is desired for the removal of dirt, dust, grime, etc. upon the relatively dry surface of the windshield, the oscillating wiper sweeps the absorbent cover over the window and the dirt is brushed aside by the covered blade and, to a considerable extent, is also absorbed into the layers of the porous covering. Thus, it is believed evident that the windshield may be quickly and easily cleared of dirt and grime, without smearing, even though the outer surface of the windshield is dry.

Longitudinal sliding movement of the cover upon the blade assembly as the wiper oscillates does not occur because of the frictional resistance between the resilient blade 15 and the inner surface of the cover. This resistance is increased by the normal tension of the wiper arm and is substantially greater than any longitudinally acting forces applied to the outer surface of the cover during normal operation of the covered wiper.

As already pointed out, the length of the open-ended cover is preferably slightly less than the length of the wiper blade extending therethrough. The advantage of this construction lies in the fact that no portion of the cover extends beyond the ends of the wiper blade and that therefore the creased bottom surface of the cover will tend to wear evenly. Through extended use of the covered wiper, the creased bottom portion of each of the plies or layers successively wears through until the wiper blade itself comes into contact with the window. Since there is nothing to restrain either longitudinal or upward movement of the worn cover, continued operation of the wiper mechanism results in the discarding of that cover.

In the illustration given, I have disclosed the wiper cover as being formed from four plies or layers of absorbent sheet material. It is to be understood, however, that a greater or smaller number of layers may be provided to achieve substantially the same results.

In the embodiment illustrated in FIGURE 6, cover 17', like the cover already described, is longitudinally elongated and is formed from a plurality of layers of absorbent sheet material. Stiffening strips 20' are secured to the free longitudinal edges of the cover by staples 21'. It will be noted, however, that these longitudinal edge portions of the cover are not connected to each other at any intermediate point, unlike the structure shown in FIGURES 1-5.

Each of the side walls of cover 17' is provided at its ends with end strips 30 attached to the cover by staples 31. The staple at each end of the elongated cover extends through both side walls and both end strips so that cover 17' is closed or sealed at its ends. Thus, the cover is locked against longitudinal sliding movement upon a wiper blade assembly after that assembly has been placed within the interior of the cover. Since the closed ends of the cover must, of necessity, extend beyond the ends of the wiper blade disposed therein, it is apparent that uniform wear along the creased edge of the cover 17' is less likely to occur than with cover 17 of FIGURES 1-5. Furthermore, since the ends of the cover 17' will remain connected even after the cover's bottom edge has worn through, it is evident that cover 17' is not self-discarding. In other respects, however, the two forms of the invention illustrated in the drawings, are identical.

While in the foregoing I have disclosed two embodiments of the present invention in considerable detail for purposes of illustration, it will be understood by those skilled in the art that many of these details may be varied considerably without departing from the spirit and scope of the invention.

I claim:

1. A windshield wiper attachment for the cleaning of relatively dry windshields, comprising an elongated cover formed of dry dirt-absorbent sheet material, said cover having side walls and having a generally V-shaped cross section, said side walls having free longitudinal edge portions connected to each other at least at one point therealong for retaining a wiper blade disposed between said walls, said cover being open at least at one end thereof for longitudinal self-discarding movement of the same from an oscillating windshield wiper when the windshield-contacting portion of said cover has worn through.

2. The structure of claim 1 in which said cover is open at both ends thereof.

3. The structure of claim 1 in which said cover is shorter in length than the wiper blade adapted to be received therein, whereby, said cover tends to wear evenly as it wipes a windshield upon oscillating movement of said wiper.

4. A windshield wiper attachment for the cleaning of relatively dry windshields, comprising an elongated cover formed of dry dirt-absorbent sheet material, said cover having side walls and having a generally V-shaped cross section, said side walls having longitudinally-extending reinforcing elements along the free longitudinal edge portions thereof and having the reinforced edge portions connected to each other at a point intermediate the ends thereof for retaining a wiper blade disposed between said walls, said cover being shorter in length than the wiper blade adapted to be received therein, whereby, said cover is adapted to receive a wiper blade between said side walls and to bear against a windshield for cleaning the same as said wiper is moved, said cover being automatically released from an oscillating wiper blade when the windshield-contacting portion of said cover has worn through.

5. A windshield wiper attachment for clearing dirt from relatively dry windshields comprising an elongated cover formed of dry porous sheet material, said cover having yieldable side walls and having a generally V-shaped cross section, said side walls having free longitudinal upper edge portions connected to each other at a single point therealong, said side walls also being provided with longitudinally-elongated reinforcing means for stiffening the upper longitudinal edge portions thereof, said cover being open at its ends and being shorter in length than the wiper blade adapted to be received therein, whereby, said cover is adapted to receive a wiper blade between said side walls and to bear against the outer surface of a windshield for clearing dirt from said windshield as said wiper oscillates, said cover being automatically released from an oscillating wiper when the windshield-contacting portion of said cover has worn through.

References Cited in the file of this patent

UNITED STATES PATENTS

| | | |
|---|---|---|
| Re. 21,367 | Ryan | Feb. 20, 1940 |
| 2,381,767 | Mayer | Aug. 7, 1945 |
| 2,737,136 | Ryder | Mar. 6, 1959 |